Sept. 27, 1932.  R. A. OLSEN ET AL  1,879,633
HYDRAULICALLY CONTROLLED VARIABLE SPEED PULLEY
Filed June 2, 1928
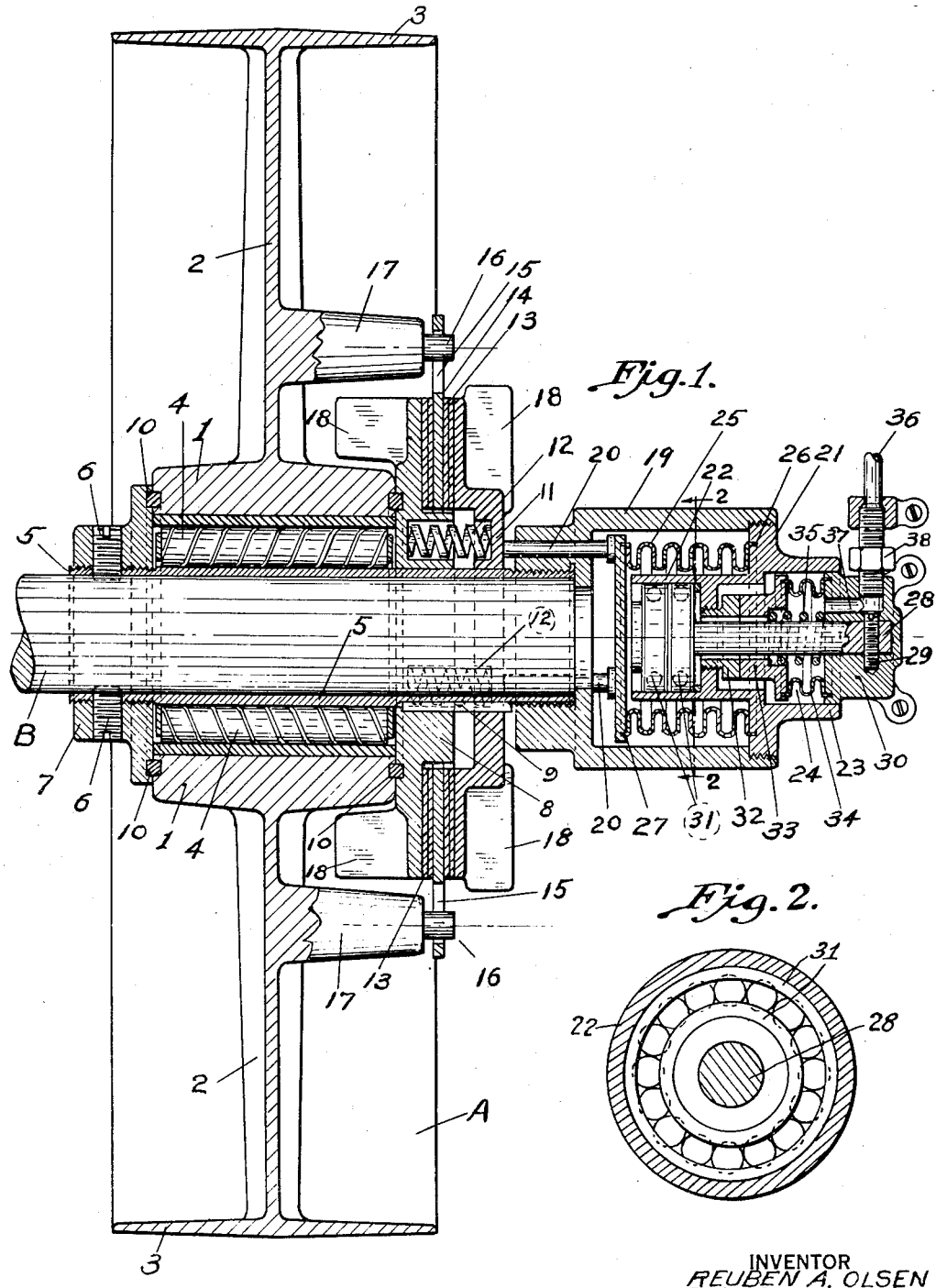
INVENTOR
REUBEN A. OLSEN
RICHARD H. SHADRICK
BY
ATTORNEY Patented Sept. 27, 1932

1,879,633

UNITED STATES PATENT OFFICE

REUBEN A. OLSEN AND RICHARD H. SHADRICK, OF MINNEAPOLIS, MINNESOTA

HYDRAULICALLY CONTROLLED VARIABLE SPEED PULLEY

Application filed June 2, 1928. Serial No. 282,386.

This invention relates to what are commonly known as variable speed pulleys, and the main object is to provide a power transmitting mechanism, including a driving and a driven member, whereby the speed of the two members, with respect to each other may be varied at will through a practical efficient and highly novel pressure controlled and friction responsive mechanism. The device herein disclosed illustrates a pressure responsive unit, that is similar to but an improvement over the device shown in our copending application, Ser. No. 226,744, filed October 17th, 1927, for hydraulically controlled variable speed device, now Patent No. 1,758,370, issued May 13, 1930, and also shows a pulley-friction design that is particularly adaptable for the control system shown in our said previous application.

In the accompanying drawing, Fig. 1 is a vertical sectional elevation taken diametrically through a device embodying our present invention.

Fig. 2 is an enlarged sectional detail view through the hub 22, as on the line 2—2 in Fig. 1.

Referring to the various elements and parts of the device, as shown, A designates a pulley and B the shaft upon which the pulley is mounted. For convenience of description and explanation, the pulley will be referred to as the driving member and the shaft as the driven member, although it is obvious that the converse may be true, i. e., the shaft may be employed to drive the pulley.

The pulley A has a hub 1, connected by the usual web or spokes 2 to the belt engaging rim 3. The hub 1 is provided with roller bearings 4, that ride upon a sleeve 5. The sleeve 5 is non-rotatably secured upon the shaft B by set screws 6 that also secure a stop collar 7 which acts as a bearing or guide against one end of the hub 1. At the other end of the hub 1 is a plate 8, which is tightly fitted upon the sleeve 5 and is further prevented from rotation thereon by a key 9. It will also be noted that the inner faces of the members 7 and 8, and the ends of the hub 1 are provided with annular recesses in which are secured sealing rings 10. Thus the lubricant for the bearings 4 is closely confined and can not escape, which is very essential in the present device as it is necessary to prevent any oil or grease from coming in contact with the friction disks and linings presently to be described.

Slidably secured upon the sleeve 5, but held against rotation thereon by the key 9, is a second plate 11, which is yieldably spread from the plate 8, by springs 12. Opposed faces of the plates 8 and 11 are provided with washer shaped linings 13, adapted to frictionally engage or contact with the outside faces of a friction disk 14. The disk 14 is provided, near its outer edge, with holes or slots 15 which freely receive pins 16 of lugs 17 that extend laterally from the pulley spokes or web 2, so that the disk and pulley will always rotate together, yet the disk can freely adjust itself between the linings 13, to compensate for wear. It may here be noted that the plates 8 and 11 are provided with radial fins 18, the object of which is to give the plates a greater cooling surface to dissipate the heat resulting from the frictional driving contact between the disk 14 and linings 13.

Upon the outer end of the sleeve 5 is screwed, or otherwise firmly secured, a cup shaped casting 19, in the inner end of which is slidably secured three circumferentially spaced pins 20, adapted to bear, endwise, against the plate 11, so as to press it toward the plate 8 and thus frictionally clamp the disk 14. It will of course be understood that the members 8, 11 and 19 all rotate with the sleeve 5 on the shaft B, that none of these parts move except when the plates 8 and 11 are clamped upon the disk 14 under the action of the pins 20, and that the speed of the shaft B, with respect to the pulley A, will depend entirely upon the pressure exerted by the pins 20 as this pressure determines the degree of slippage, or driving friction against the disk.

The housing 19 has an end plate 21, which screws into the housing, and this plate 21 has an integral hollow hub the inner end 22 of which extends well into the housing 19, while its outer end 23 forms an axial chamber 24.

Within the housing 19, and spaced about the hub end 22 is a diaphragm 25 of the accordion or resilient type that is longitudinally expansible under the action of internal, fluid pressure, and the outer end of this diaphragm is anchored and sealed with respect to the plate 21, as at 26, so that it can only expand in the other direction. At the other end the diaphragm 25 is sealed to a plate 27, which plate is sufficiently heavy or rigid so that it will not become distorted under the internal pressure of the diaphragm, but will, when moved by such pressure, transmit the same to the plate 11, through the equalizing pins 20.

A stub shaft 28 is secured at one end, as at 29, in a rigidly mounted non-rotatable bracket head 30, that effectively seals the outer end of the hub section 23. The inner end of the shaft 28 extends into the hub section 22 with which it contacts or has bearing engagement through bearing rings 31 of any suitable or well known construction. About an intermediate portion of the shaft 28, and concentrically spaced therefrom are two collars 32 and 33, the first of which screws into the hub section 22, while the latter is carried on one end of a small expansible diaphragm 34, which in turn is secured at its other end to the block or head 30. A spring 35 tends to press the collar 33 into sealing contact with the collar 32. The diaphragm 25, it will be seen, has fluid connection with the diaphragm 34, through the bearing rings 31 and through the space between the shaft 28 and collars 32 and 33, and the diaphragm 34 is supplied with fluid under pressure from a pipe or tube 36, through a duct 37 and the necessary nipple connections 38. Fluid under desired pressures is supplied to the pipe 36 in any suitable manner, a preferred method being shown and described in our previously noted Patent No. 1,758,370.

As the operating fluid fills the diaphragm 34 under pressure, it tends to expand the latter longitudinally, and in so doing supplements the action of the spring 35 in closing the joint between the two collars 32 and 33, so that the fluid cannot escape, and as the operating fluid is preferably oil, such oil will lubricate said joint and also the bearings 31. It will thus be seen that all the working parts of the pressure unit are enclosed, thus being removed from dust and dirt, that the working parts are all lubricated by the operating fluid, and that said fluid is practically sealed against loss by leakage, the only joint (between 32 and 33) through which it could possibly escape being sealed under the high pressure of the fluid itself.

It is understood that suitable modifications may be made in the general design and structural details of the invention as herein shown, provided, however, that said modifications come within the spirit and scope of the appended claim.

Having now therefore fully shown and described our invention, what we claim to be new and desire to protect by Letters Patent is:

A pressure unit for applying pressure to a friction clutch to establish a relative driving speed between two members, comprising a housing secured to one of the members, pressure pins extending from the housing for engagement with the clutch, an end plate closing the outer end of the housing, a diaphragm contained within the housing for engagement with the pressure pins, said end plate having integral inner and outer hub portions and said inner hub portion having a partition forming flange, a fluid seal collar threaded in said flange, a second fluid seal collar in contact with the first seal collar, a stationary bracket head disposed in the said outer hub portion, and a second diaphragm carried by the bracket head and resiliently supporting the said second fluid seal collar, said bracket head having a duct for supplying fluid to the second diaphragm, and said collars having passageways through which said fluid may flow from said second to said first mentioned diaphragms.

In testimony whereof we affix our signatures.

REUBEN A. OLSEN.
RICHARD H. SHADRICK.